United States Patent
Kitaoka

(10) Patent No.: US 9,734,483 B2
(45) Date of Patent: Aug. 15, 2017

(54) PRODUCT MANAGEMENT DEVICE AND PRODUCT MANAGEMENT METHOD

(71) Applicant: PANASONIC INTELLECTUAL PROPERTY MANAGEMENT CO., LTD., Osaka (JP)

(72) Inventor: Hirokazu Kitaoka, Fukuoka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 15/009,944

(22) Filed: Jan. 29, 2016

(65) Prior Publication Data
US 2016/0267429 A1    Sep. 15, 2016

(30) Foreign Application Priority Data
Mar. 10, 2015    (JP) ................. 2015-047377

(51) Int. Cl.
*G06K 7/08* (2006.01)
*G06Q 10/08* (2012.01)
*G06K 7/10* (2006.01)

(52) U.S. Cl.
CPC ....... *G06Q 10/087* (2013.01); *G06K 7/10722* (2013.01)

(58) Field of Classification Search
CPC .... G06K 7/0008; G06K 13/08; G06F 3/1454; G06Q 30/02; G06Q 30/06; G06Q 20/20; G06Q 10/087; G06Q 10/08; G07F 7/1008
USPC ............ 235/451, 439, 375, 383, 385
See application file for complete search history.

(56) References Cited

U.S. PATENT DOCUMENTS 5,609,223 A * 3/1997 Iizaka ............... A47F 9/046
  186/61
2009/0014514 A1 1/2009 Hatori et al.

FOREIGN PATENT DOCUMENTS

| CN | 202700831 | 1/2013 |
| JP | 10-035827 | 2/1998 |
| JP | 2001-256552 | 9/2001 |

OTHER PUBLICATIONS

The Extended European Search Report dated Jul. 12, 2016 for the related European Patent Application No. 16152112.5.

* cited by examiner

*Primary Examiner* — Karl D Frech
(74) *Attorney, Agent, or Firm* — Greenblum & Bernstein, P.L.C.

(57) ABSTRACT

A product management device searches for a missing bar-code ID which is not present among bar-code IDs read by a reading section from among a list of bar-code IDs recorded, in advance, in a predetermined order, calculates a reading time of the missing bar-code ID using reading times associated with bar-code IDs before and after the missing bar-code ID, and instructs the outputting of image data of capture times by cameras of the product to which the missing bar-code ID is attached using the calculated reading time, the relative positions of the cameras, and a speed of a belt conveyor.

9 Claims, 7 Drawing Sheets

FIG. 2

| No | BAR-CODE ID |
|---|---|
| 1 | AABBB123 |
| 2 | DDBBB123 |
| 3 | EEBBB123 |
| 4 | FFBBB222 |
| : | : |

FIG. 4

| READING TIME | BAR-CODE ID |
|---|---|
| 10:10:30 | AABBB123 |
| 10:10:33 | DDBBB123 |
| 10:10:39 | FFBBB222 |
| 10:10:42 | XXXXXXXX |
| : | : |

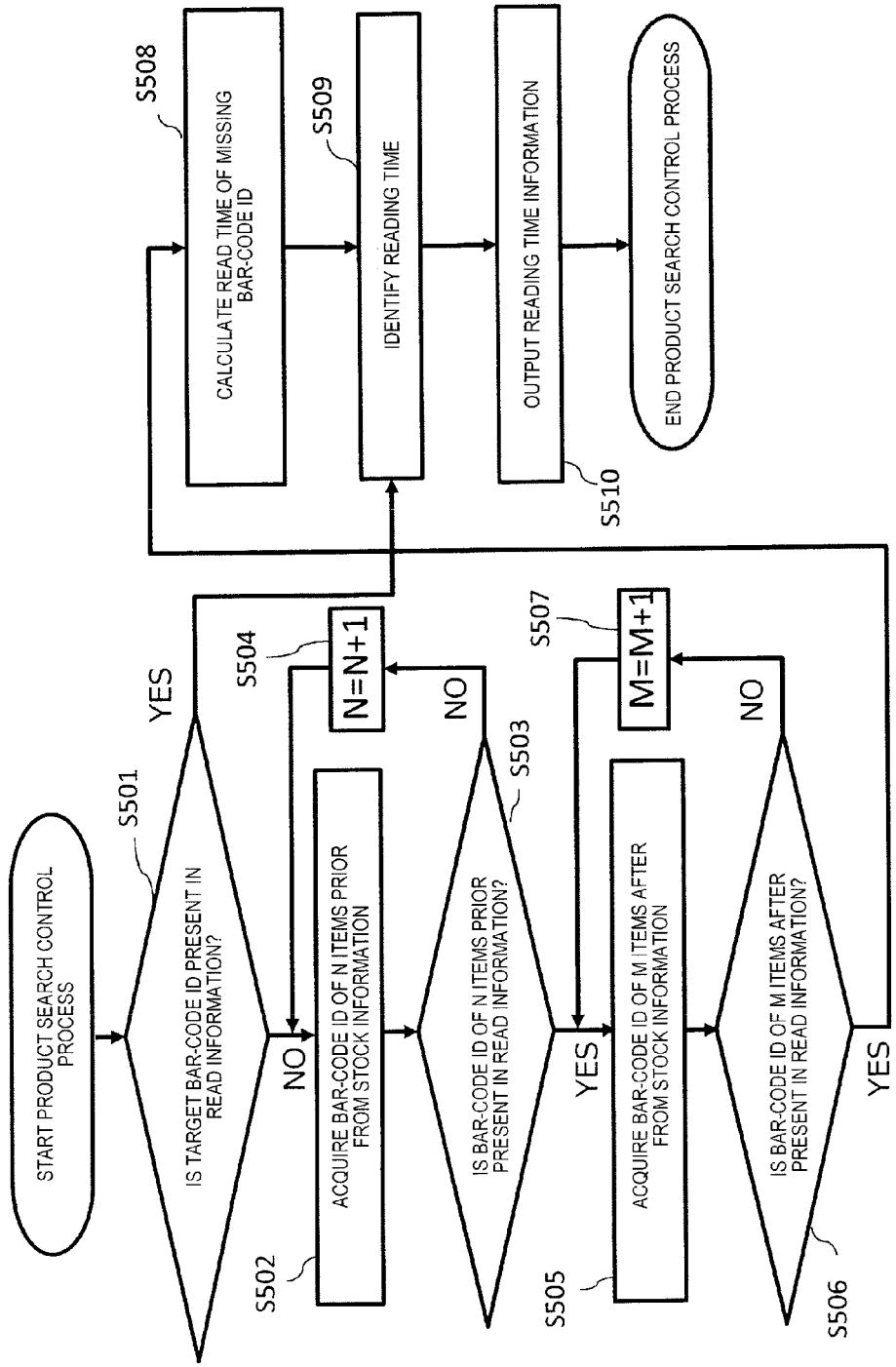

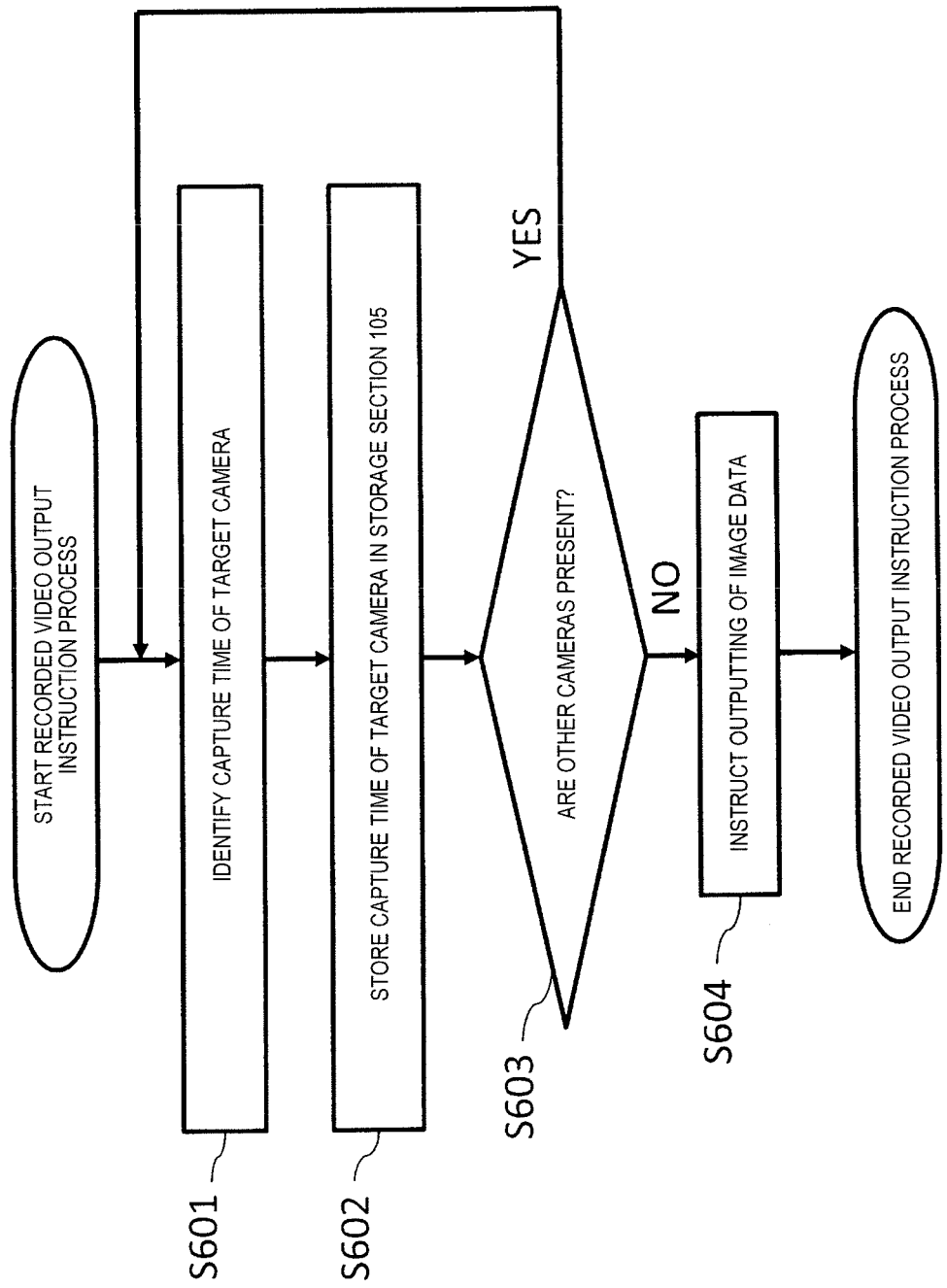

N3

N3

PRODUCT MANAGEMENT DEVICE AND PRODUCT MANAGEMENT METHOD

BACKGROUND OF THE INVENTION

1. Field of the Invention

The present invention relates to a product management device and a product management method which manage products carried thereto by a belt conveyor in a predetermined order using a video recording device which records image data of images captured by a camera.

2. Description of the Related Art

In the related art, there is known a product management system which manages products such as merchandise using bar-code data read by a scanner. There is a product management system in which management is performed using images captured by a camera in addition to the bar-code data.

Japanese Patent Unexamined Publication No. 2001-256552 discloses a product management system in which data from barcode data is recorded in and reproduced from a recording device at the same time as a video signal from a monitoring camera.

Japanese Patent Unexamined Publication No. 10-35827 discloses an inventory unit provided with a digital camera and a barcode reader. In Japanese Patent Unexamined Publication No. 10-35827, a barcode label attached to the side surface of a product is read by a barcode reader, and when the data read by the barcode reader does not match the product data accumulated in the inventory management computer, the product is captured by a digital camera, and reconfirmation is performed.

However, in Japanese Patent Unexamined Publication No. 2001-256552, no countermeasures are taken with regard to errors in reading the bar-code data. Therefore, in Japanese Patent Unexamined Publication No. 2001-256552, it is not possible to distinguish between a case in which the bar-code data may not be read due to no product being present on the belt conveyor, and a case in which a reading error occurs.

In Japanese Patent Unexamined Publication No. 10-35827, the product is not captured until it is determined whether or not the data read by the bar-code reader matches the product data accumulated in the inventory management computer. Therefore, in Japanese Patent Unexamined Publication No. 10-35827, time is required until a case in which the bar-code data may not be read due to no product being present on the belt conveyor is distinguished from a case in which a reading error occurs. In Japanese Patent Unexamined Publication No. 10-35827, since the inventory unit is configured to include a bar-code reader and a camera, it is not applicable to a system in which the bar-code reader and the camera are disposed in separated positions.

SUMMARY OF THE INVENTION

An object of the present disclosure is to provide a product management device and a product management method capable of easily confirming a case in which an item of identification information attached to a product may not be read due to no product being present on a belt conveyor, and a case in which a reading error of the identification information occurs when the product which is carried by the belt conveyor is automatically managed, regardless of the configuration of the system.

According to the present disclosure, there is provided a product management device which manages products which are carried thereto by a belt conveyor in a predetermined order using a video recording device which records image data of images captured by a camera, including: a reading section which reads identification information of the product attached to a surface of the product and acquires read information in which the read identification information is associated with a reading time of the identification information, a product search control section which acquires a list of items of the identification information recorded, in advance, in the predetermined order, searches for missing identification information which is identification information which is not present in the read information among the list of items of identification information, and calculates the reading time of the missing identification information using the reading times associated with the items of identification information before and after the missing identification information in the read information, and a recorded video output instructing section which identifies a capture time by the camera of the product to which the missing identification information is attached using the reading time calculated by the product search control section, the relative position of the camera, and a speed of the belt conveyor, and instructs the video recording device to output the image data of the capture time.

According to the present disclosure, it is possible to easily confirm a case in which an item of identification information attached to a product may not be read due to no product being present on a belt conveyor, and a case in which a reading error of the identification information occurs when the product which is carried by the belt conveyor is automatically managed, regardless of the configuration of the system.

BRIEF DESCRIPTION OF DRAWINGS

FIG. 2 is a diagram illustrating stock information according to the embodiment of the present invention;

FIG. 4 is a diagram illustrating read information according to the embodiment of the present invention;

FIG. 5 is a flowchart illustrating the operations of a product search control section according to the embodiment of the present invention;

FIG. 6 is a flowchart illustrating the operations of a recorded video output instructing section according to the embodiment of the present invention;

DETAILED DESCRIPTION OF THE PREFERRED EMBODIMENT

Hereinafter, detailed description will be given of the embodiment of the present invention, with reference to the drawings, as appropriate.

Configuration of Product Management System

Figure 1:
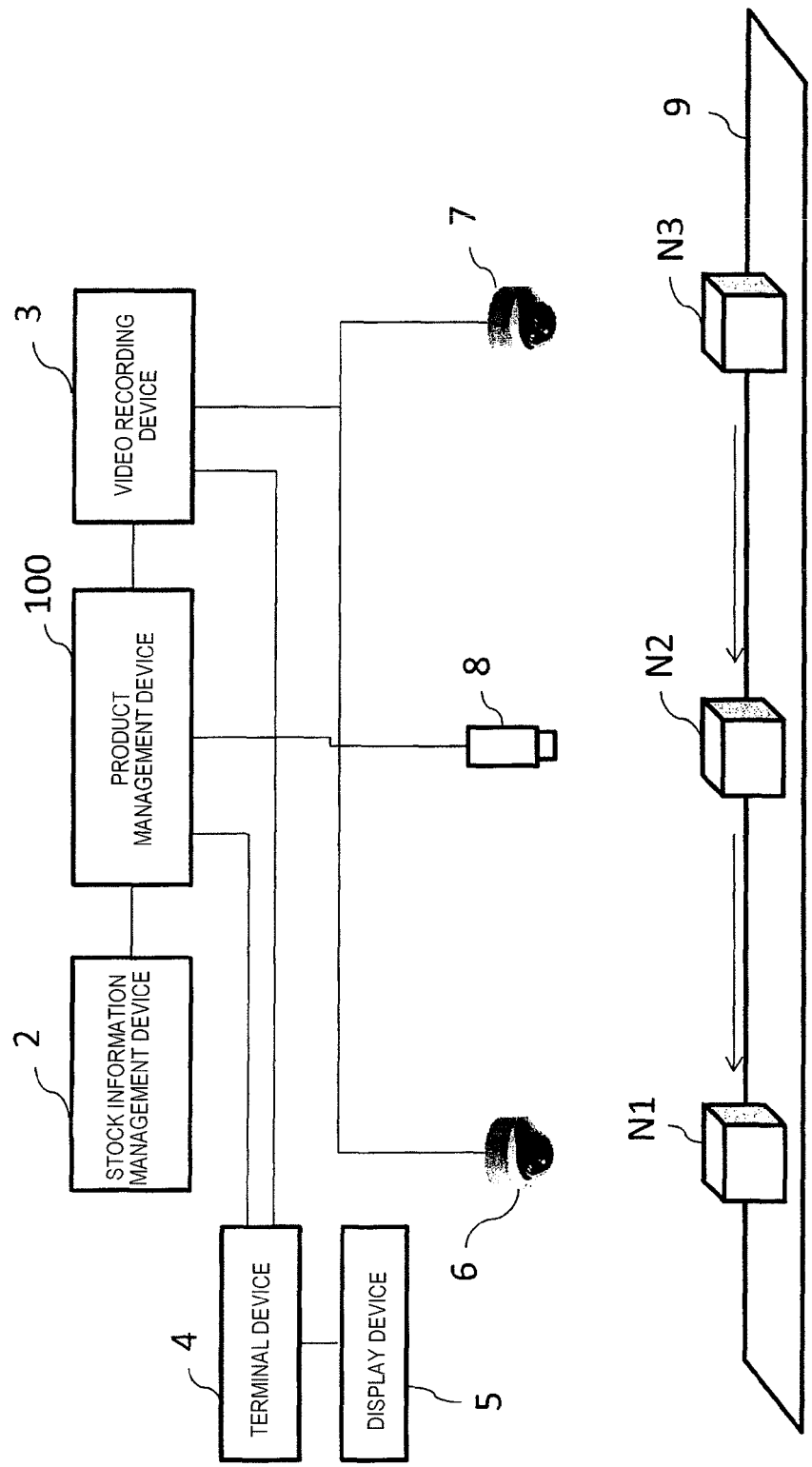
FIG. 1 is a block diagram illustrating the configuration of a product management system according to an embodiment of the present invention.

Hereinafter, detailed description will be given of the configuration of product management system 1 according to the embodiment of the present invention, with reference to FIGS. 1 and 2.

Product management system 1 according to the present embodiment includes stock information management device 2, video recording device 3, terminal device 4, display device 5, a plurality of cameras 6 and 7, reading device 8, belt conveyor 9, and product management device 100.

Stock information management device 2 acquires and stores stock information. As illustrated in FIG. 2, the stock information is a list of bar-code IDs in which the bar-code IDs which are identification information of the products and are attached to all of the stocked products in the order in which the products are carried on belt conveyor 9.

Video recording device 3 is provided with a timer (not shown) and records the image data of images captured by camera 6 and camera 7 associated with the times measured by the timer. Video recording device 3 outputs the image data for which outputting is instructed by product management device 100 to terminal device 4.

Terminal device 4 outputs a search instruction signal instructing the searching of a bar-code ID in product management device 100 to product management device 100. Terminal device 4 executes an image display process for causing display device 5 to display the images of the image data which is input from video recording device 3. Terminal device 4 is typically a personal computer.

Display device 5 displays images according to the image display process of terminal device 4.

Each camera 6 and 7 captures the product passing directly thereunder on belt conveyor 9 and outputs the image data to video recording device 3.

Reading device 8 reads the bar-code ID attached to the surface of the product passing directly thereunder on belt conveyor 9 and outputs the read bar-code ID to product management device 100.

Belt conveyor 9 moves products N1, N2, and N3 in one direction at a predetermined fixed speed.

Product management device 100 manages products N1, N2, and N3 which are carried thereto by belt conveyor 9 using the bar-code IDs which are read by reading device 8 and the images which are captured by camera 6 and camera 7 and recorded in video recording device 3.

Configuration of Product Management Device

Figure 3:
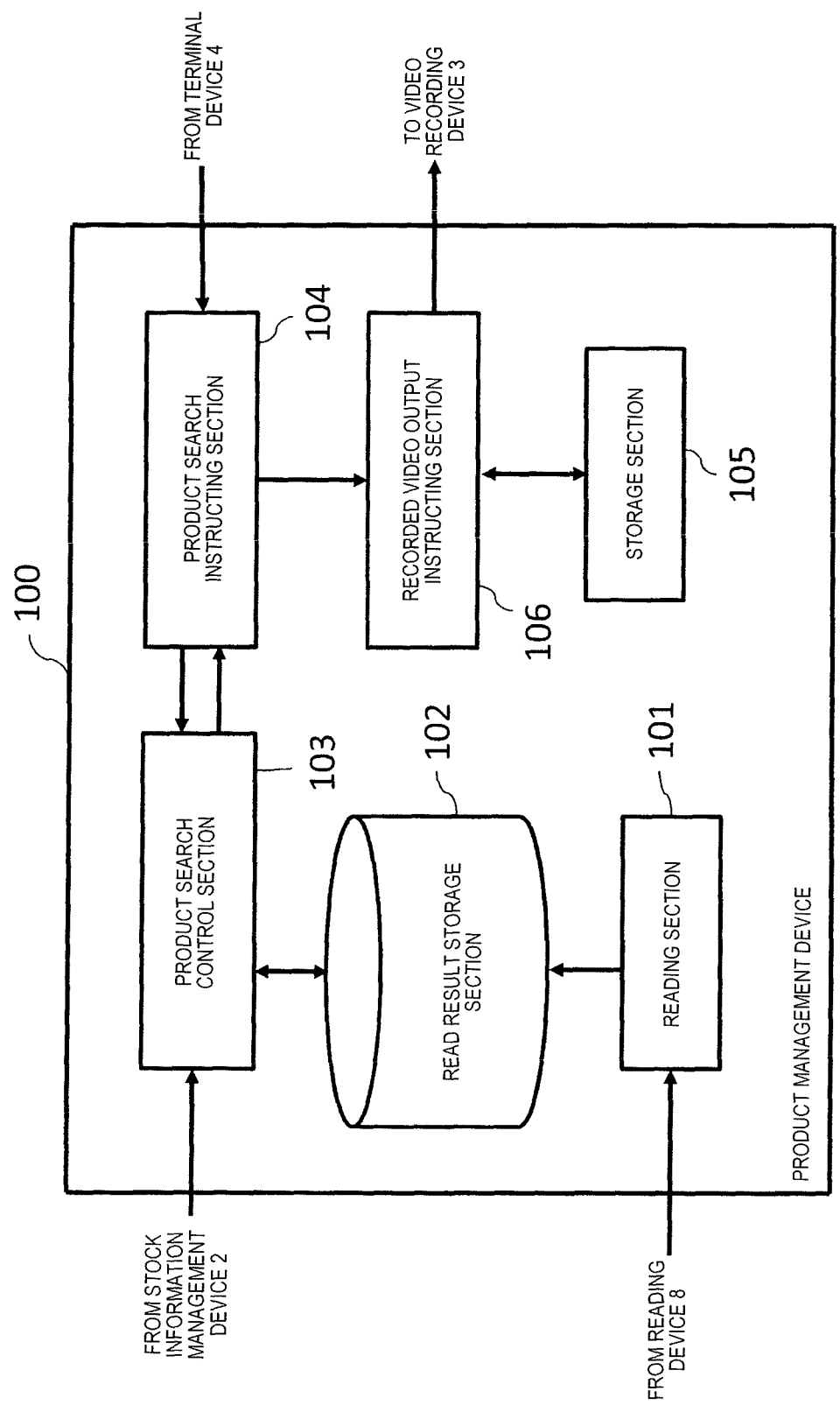
FIG. 3 is a block diagram illustrating the configuration of a product management device according to the embodiment of the present invention.

Next, hereinafter, detailed description will be given of the configuration of product management device 100 according to the embodiment of the present invention, with reference to FIGS. 3 and 4.

Product management device 100 is mainly formed of reading section 101, read result storage section 102, product search control section 103, product search instructing section 104, storage section 105, and recorded video output instructing section 106.

Reading section 101 is connected to reading device 8 and controls the reading operation of the bar-code ID of reading device 8. A timer (not shown) is provided with on the inner portion of reading section 101, and read information in which the bar-code IDs read by reading device 8 are associated with reading times is acquired from reading device 8. Reading section 101 stores the acquired read information in read result storage section 102. As illustrated in FIG. 4, the read information is information in which the reading times and the bar-code IDs are associated.

Read result storage section 102 stores the read information acquired by reading section 101.

When product search control section 103 receives input of the search instruction signal from product search instructing section 104, product search control section 103 starts the product search control process, acquires the stock information from stock information management device 2, and acquires the read information from read result storage section 102.

When the target bar-code ID of the search target is present in the read information among the bar-code IDs of the stock information, product search control section 103 outputs the reading time information indicating the reading time associated with the target bar-code ID in the read information to product search instructing section 104.

Meanwhile, when the target bar-code ID of the search target is not present in the read information among the bar-code IDs of the stock information, product search control section 103 calculates the reading time of the missing bar-code ID based on the reading times associated with the bar-code IDs before and after the bar-code ID (hereinafter, described as a "missing bar-code ID") which is not present in the read information. Product search control section 103 outputs the reading time information indicating the calculated reading time to product search instructing section 104. Detailed description of the operations of product search control section 103 will be given later.

When product search instructing section 104 receives input of a search instruction signal from terminal device 4, the product search instructing section 104 outputs the input search instruction signal to product search control section 103. Product search instructing section 104 outputs the reading time information which is input from product search control section 103 to recorded video output instructing section 106.

Storage section 105 stores relative position information indicating the relative positions of camera 6 and camera 7, and speed information indicating the speed of belt conveyor 9 in advance.

When recorded video output instructing section 106 receives input of the reading time information from product search instructing section 104, recorded video output instructing section 106 starts the video recording output instruction process and reads the relative position information and the speed information from storage section 105. Recorded video output instructing section 106 identifies the capture times of camera 6 and camera 7 using the reading time information which is input from product search instructing section 104, the relative positions of camera 6 and camera 7 indicated by the relative position information, and the speed of belt conveyor 9 indicated by the speed information. Recorded video output instructing section 106 outputs an output instruction signal instructing the output of the image data of the identified capture time to video recording device 3. Description of the operations of recorded video output instructing section 106 will be given later.

Operations of Product Search Control Section

Hereinafter, detailed description will be given of the operations of product search control section 103 according to the embodiment of the present invention, with reference to FIG. 5.

When product search control section 103 receives input of the search instruction signal from product search instructing section 104, product search control section 103 starts the product search control process, acquires the stock information from stock information management device 2, and acquires the read information from read result storage section 102. Product search control section 103 determines whether or not the target bar-code ID selected from among the bar-code IDs of the stock information is present in the read information (S501).

When the target bar-code ID is not present in the read information (NO in S501), product search control section 103 stores the target bar-code ID as a missing bar-code ID and acquires the bar-code ID one prior to the target bar-code ID from the stock information (S502). Product search control section 103 sets "1" as the initial value of number N by which to go back from the target bar-code ID.

Product search control section 103 determines whether or not the bar-code ID one prior is present in the read information (S503).

When the bar-code ID one prior is not present in the read information (NO in S503), product search control section 103 stores the bar-code ID one prior as a missing bar-code ID, increments number N by which to go back (S504), and performs the processes of S502.

Meanwhile, when the bar-code ID one prior is present in the read information (YES in S503), product search control section 103 acquires the bar-code ID one after the target bar-code ID from the stock information (S505). Product search control section 103 sets "1" as the initial value of number M by which to proceed from the target bar-code ID.

Product search control section 103 determines whether or not the bar-code ID one after is present in the read information (S506).

When the bar-code ID one after is not present in the read information (NO in S506), product search control section 103 stores the bar-code ID one after as a missing bar-code ID, increments number M (S507), and performs the processes of S505.

Meanwhile, when the bar-code ID one after is present in the read information (YES in S506), product search control section 103 calculates the read time of the stored missing bar-code ID (S508). Specifically, product search control section 103 calculates the time from the reading time of the bar-code ID N items prior which is not missing in the read information until the reading time of the bar-code ID M items after which is not missing in the read information. Product search control section 103 divides the calculated time by a value obtained by adding "1" to the number of the missing bar-code ID to calculate the read time.

Product search control section 103 identifies the reading time (S509). Specifically, product search control section 103 identifies the reading time of the missing bar-code ID M items prior by adding the time of the time information associated with the bar-code ID N items prior which is not missing to the read time calculated in S508. Product search control section 103 sequentially adds a number of read times equal to the number of missing bar-code IDs, and identifies the reading time of each missing bar-code ID.

Product search control section 103 outputs the reading time information indicating the identified reading time (S510) and ends the product search control process.

In the process of S501, when the target bar-code ID is present in the read information (YES in S501), product search control section 103 identifies the reading time associated with the target bar-code ID in the read information (S509).

Operations of Recorded Video Output Instructing Section

Hereinafter, detailed description will be given of the operations of recorded video output instructing section 106 according to the embodiment of the present invention, with reference to FIG. 6.

Recorded video output instructing section 106 starts the recorded video output instruction process due to receiving input of the reading time information from product search instructing section 104, and identifies the capture times in target camera 6 and camera 7 (S601).

Specifically, recorded video output instructing section 106 reads the relative position information and the speed information from storage section 105. Recorded video output instructing section 106 divides the relative position of camera 6 indicated by the relative position information by the speed of belt conveyor 9 indicated by the speed information, and calculates the time taken for the product to move from reading device 8 to camera 6. Recorded video output instructing section 106 adds the calculated time to the reading time indicated by the reading time information which is input from product search instructing section 104, and calculates the capture time at which camera 6 performed the capturing. Recorded video output instructing section 106 divides the relative position of camera 7 indicated by the relative position information by the speed of belt conveyor 9 indicated by the speed information, and calculates the time taken for the product to move from camera 7 to reading device 8. Recorded video output instructing section 106 subtracts the calculated time from the reading time information which is input from product search instructing section 104, and calculates the capture time at which camera 7 performed the capturing. Belt conveyor 9 moves from the right to the left in FIG. 1.

Recorded video output instructing section 106 stores the calculated capture time in storage section 105 (S602).

Next, recorded video output instructing section 106 determines whether or not there is a camera for which the capture time has not been calculated by referring to the number of cameras stored, in advance, in storage section 105 (S603).

When there are no cameras for which the capture time has not been calculated (NO in S603), by outputting capture time information indicating the calculated capture time to video recording device 3, recorded video output instructing section 106 instructs the outputting of the image data associated with the capture time (S604) and ends the recorded video output instruction process.

Meanwhile, when there is a camera for which the capture time has not been calculated (YES in S603), recorded video output instructing section 106 performs the process of S601.

Example of Image Display

For example, in the examples of FIGS. 2 and 4, it will be assumed that product N3 (No. 3) with a bar-code ID of EEBBB123 is missing. Recorded video output instructing section 106 instructs video recording device 3 to output the image data associated with the capture time of product N3.

Video recording device 3 outputs the image data for which outputting is instructed by recorded video output instructing section 106 to terminal device 4. Terminal device 4 executes a display process which causes display device 5 to display the images of the image data which is input from video recording device 3. Accordingly, the image captured by camera 6 and illustrated in FIG. 7A, and the image captured by camera 7 and illustrated in FIG. 7B are displayed on display device 5.

Figure 7A:
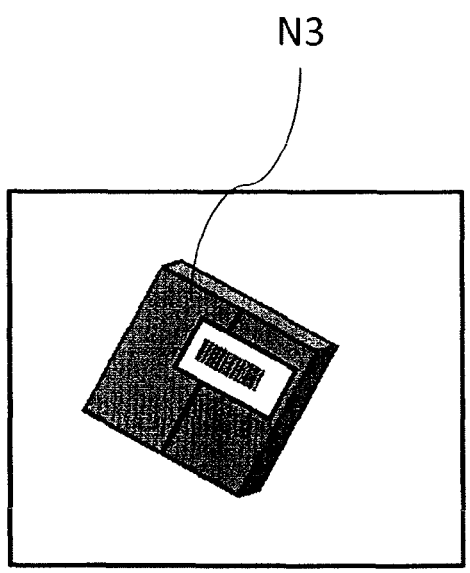
FIG. 7A is a diagram illustrating an image of a product according to the embodiment of the present invention.
Figure 7B:
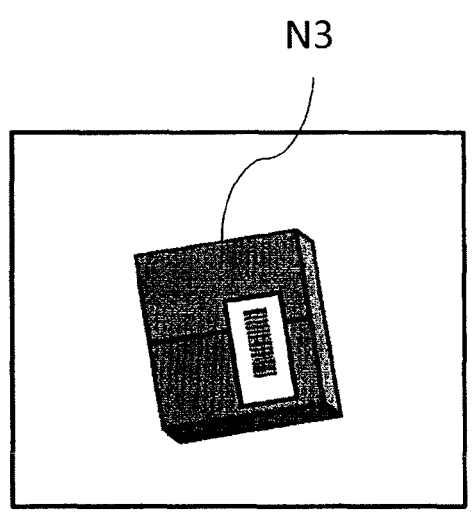
FIG. 7B is a diagram illustrating an image of the product according to the embodiment of the present invention.

In the examples of FIGS. 7A and 7B, images of product N3 to which the missing bar-code ID is attached are displayed. Therefore, by viewing these images, an operator can determine that a reading error of the bar-code ID has occurred for product N3.

In this manner, according to the present embodiment, the bar-code ID of the product attached to the surface of the product and the reading time of the bar-code ID are acquired in an associated state, and the reading time of the missing bar-code ID is calculated from the reading times associated of the bar-code IDs before and after the missing bar-code ID. The capture times of the product to which the missing bar-code ID is attached by camera 6 and camera 7 are identified based on the calculated reading time, the relative positions of camera 6 and camera 7, and the speed of belt conveyor 9, and video recording device 3 is instructed to output the image data of the capture time. Accordingly, when the product which is carried by belt conveyor 9 is automatically managed, it is possible to easily confirm a case in which the bar-code ID attached to the product may not be read due to no product being present on belt conveyor 9, and a case in which a reading error of the bar-code ID occurs.

According to the present embodiment, by identifying each capture time captured by a plurality of cameras 6 and 7 and instructing video recording device 3 to output the image data of each capture time, it is possible to display images captured using a plurality of cameras, and, it is possible to reliably and easily confirm a case in which the bar-code ID attached to the product may not be read due to no product being present on belt conveyor 9, and a case in which a reading error of the bar-code ID occurs.

In the present invention, the number of members, the dispositions, the numbers, and the like are not limited to those of the embodiment described earlier, and it is possible to modify the present invention within a scope which does not depart from the gist of the invention such as by exchanging, as appropriate, the constituent elements with elements that achieve the same operations and effects.

Specifically, in the present embodiment, description is given of an example in which images captured using two cameras 6 and 7 are displayed; however, the present invention is not limited thereto, and images captured using one camera or three or more cameras may be displayed.

In the present embodiment, description is given of an example in which the bar-code ID is read; however, the present invention is not limited thereto, and identification information other than a bar-code ID may be read.

What is claimed is:

1. A product management device which manages products which are carried to the product management device in a predetermined order using a video recording device which records images captured by a camera, the product management device comprising:
   a reader that reads a plurality of product identification information, each product identification information being attached to a surface of a product; and
   a controller that executes instructions, the instructions, when executed by the controller, causing the controller to perform operations including:
   acquiring a stock list including a plurality of stock identification information;
   acquiring a reading list including the read plurality of product identification information, in which each product identification information of the read plurality of product identification information is associated with a reading time of the product identification information;
   acquiring target identification information from the plurality of the stock identification information in the stock list; and
   searching the reading list to determine whether or not the target identification information is present in the reading list,
   wherein, when the target identification information is not present in the reading list, the controller further performs operations including:
   identifying the target identification information, which is not present in the reading list, as a missing identification information;
   acquiring a preceding stock identification information from the stock list, the preceding stock identification information appearing before the missing identification information in the stock list, and being present in the reading list;
   acquiring a following stock identification information from the stock list, the following stock identification information appearing after the missing identification information in the stock list, and being present in the reading list; and
   estimating a reading time of the missing identification information based on a preceding reading time and a following reading time, the previous reading time being associated with the preceding stock identification information in the reading list, the following reading time being associated with the following stock identification information in the reading list.

2. The product management device of claim 1, wherein the controller further performs operations including:
   identifying a capture time, by the camera, of the product to which the missing identification information is attached, using the estimated reading time of the missing identification information, a relative position of the camera to the reader, and a moving speed of the product.

3. The product management device of claim 2, wherein the controller further performs operations including:
   instructing the video recording device to output an image at the identified capture time.

4. The product management device of claim 1,
   wherein the products are carried by a belt conveyor, and the controller further performs operations including:
   identifying a capture time, by the camera, of the product to which the missing identification information is attached, using a moving speed of the belt conveyor.

5. The product management device of claim 1, wherein the camera comprises a plurality of cameras, and
   the controller further performs operations including:
   identifying a plurality of capture times, captured by the plurality of the cameras, of the product to which the missing identification information is attached, and
   instructing the video recording device to output an image at each of the plurality of capture times.

6. A product management method in a product management device which manages products which are carried to the product management device in a predetermined order using a video recording device which records images captured by a camera, the product management method comprising:
   reading, by a reader, a plurality of product identification information, each product identification information being attached to a surface of a product;
   acquiring a stock list including a plurality of stock identification information;
   acquiring a reading list including the read plurality of product identification information, in which each product identification information of the read plurality of product identification information is associated with a reading time of the product identification information;
   acquiring target identification information from the plurality of the stock identification information in the stock list;
   searching the reading list to determine whether or not the target identification information is present in the reading list;
   when the target identification information is not present in the reading list, the product managing method further comprising:

identifying the target identification information, which is not present in the reading list, as a missing identification information;

acquiring a preceding stock identification information from the stock list, the preceding stock identification information appearing before the missing identification information in the stock list, and being present in the reading list;

acquiring a following stock identification information from the stock list, the following stock identification information appearing after the missing identification information in the stock list, and being present in the reading list; and estimating a reading time of the missing identification information based on a preceding reading time and a following reading time, the previous reading time being associated with the preceding stock identification information in the reading list, the following reading time being associated with the following stock identification information in the reading list.

7. The method of claim 6, further comprising:

identifying a capture time, by the camera, of the product to which the missing identification information is attached, using the estimated reading time of the missing identification information, a relative position of the camera to the reader, and a moving speed of the product.

8. The method of claim 7, further comprising:

instructing the video recording device to output an image at the identified capture time.

9. The method of claim 6, wherein the camera comprises a plurality of cameras, the method further comprising:

identifying a plurality of capture times, captured by the plurality of cameras, of the product to which the missing identification information is attached, and instructing the video recording device to output an image at each of the capture times.

* * * * *